United States Patent
Walter et al.

(10) Patent No.: US 8,825,854 B2
(45) Date of Patent: Sep. 2, 2014

(54) DMZ FRAMEWORK

(75) Inventors: Wolfgang Walter, Hambrucken (DE); Iain Morrison, Karlsruhe (DE); Gregor Rieken, Walldorf (DE); Moritz Thomas, Sandhausen (DE); Stephan Toebben, Walldorf (DE)

(73) Assignee: SAP AG, Walldorf (DE)

( * ) Notice: Subject to any disclaimer, the term of this patent is extended or adjusted under 35 U.S.C. 154(b) by 1223 days.

(21) Appl. No.: 12/277,202

(22) Filed: Nov. 24, 2008

(65) Prior Publication Data

US 2010/0131616 A1    May 27, 2010

(51) Int. Cl.
- *G06F 15/16* (2006.01)
- *G06F 12/00* (2006.01)
- *H04L 29/06* (2006.01)

(52) U.S. Cl.
CPC ......... *H04L 63/0209* (2013.01); *H04L 63/0281* (2013.01); *H04L 69/08* (2013.01)
USPC ....................................................... 709/225

(58) Field of Classification Search
USPC ......................................... 709/225–229, 250
See application file for complete search history.

(56) References Cited

U.S. PATENT DOCUMENTS

| | | | |
|---|---|---|---|
| 6,377,993 B1 * | 4/2002 | Brandt et al. | 709/227 |
| 7,058,600 B1 * | 6/2006 | Combar et al. | 705/34 |
| 2002/0103857 A1 * | 8/2002 | Soderberg et al. | 709/203 |
| 2002/0188730 A1 * | 12/2002 | Tang et al. | 709/227 |
| 2003/0161297 A1 * | 8/2003 | Noda et al. | 370/352 |
| 2006/0026300 A1 * | 2/2006 | Rose | 709/246 |
| 2006/0089853 A1 * | 4/2006 | Gauvin et al. | 705/2 |
| 2007/0106710 A1 * | 5/2007 | Haustein et al. | 707/204 |
| 2007/0168429 A1 * | 7/2007 | Apfel et al. | 709/206 |
| 2008/0010288 A1 * | 1/2008 | Hinton et al. | 707/10 |
| 2008/0021866 A1 * | 1/2008 | Hinton et al. | 707/2 |
| 2008/0320127 A1 * | 12/2008 | Fries | 709/224 |
| 2009/0064307 A1 * | 3/2009 | Holar et al. | 726/12 |

* cited by examiner

*Primary Examiner* — Zarni Maung
(74) *Attorney, Agent, or Firm* — Blakely Sokoloff Taylor & Zafman LLP

(57) ABSTRACT

A method and system for providing a secure method and process for accessing resources that are made available by a server. A demilitarized zone (DMZ) framework provides a frontend system that is protected by a firewall and separated from a backend system by a second firewall. The frontend system provides the user interface functionality common to the backend but contains no access directly to the resources that the user interface operates upon. Placing the user interface on a separate machine from the resource data provides an additional layer of security. In addition, separate communication protocols are used between the user and the frontend and between the frontend and the backend system. Thus, a malicious programmer or program will not know the location of the resource or the method for communicating with the backend server to access the resource.

17 Claims, 2 Drawing Sheets

DMZ FRAMEWORK

BACKGROUND

1. Field of the Invention

The embodiments of the invention relate to the protection of server resources. Specifically, the embodiments of the invention relate to the protection of backend resources by the utilization of a frontend system in a demilitarized zone that services user requests for backend resources where the frontend system is accessible through a first protocol and the frontend system accesses resources on a backend system using a second protocol.

2. Background

Servers provide access to a set of resources over a network to users that are located on remote machines. The remote machines utilize a client application to access the servers, sometimes referred to as the 'backend' of the system. The client application utilizes a commonly understood protocol to communicate with the backend system. For example, the client application may be a web browser that communicates with a web server on the backend system. The client application and web server communicate using the hyper text transfer protocol (HTTP). The client application generates an HTTP request specifying data that is requested, such as a hypertext markup-language (HTML) page, and sends the HTTP request over the network to the server. The server receives the request, accesses the appropriate resources such as a database or similar storage system, retrieves the requested data and sends the requested data back to the client application.

However, these systems are vulnerable to unauthorized access through a number of different methods of attack. Malicious programs and individuals can use the same communication protocol that is normally used to legitimately communicate with the server to gain access or alter resources that are not intended to be accessible or alterable by such programs or individuals. The servers can be placed behind firewalls in some instances and utilize authorization services such as password and user name authentication to attempt to limit the access to unauthorized users and malicious attacks. However, the protocol for accessing the server and the type of firewall that protects that server is easily determined. Knowing about the firewall and the protocol that is utilized by the server gives malicious programmers an advantage in trying to overcome these protection mechanisms. This knowledge can be utilized to find security holes and exploits that can be utilized to gain unauthorized access to the resources provided by the server.

BRIEF DESCRIPTION OF THE DRAWINGS

Embodiments of the invention are illustrated by way of example and not by way of limitation and the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
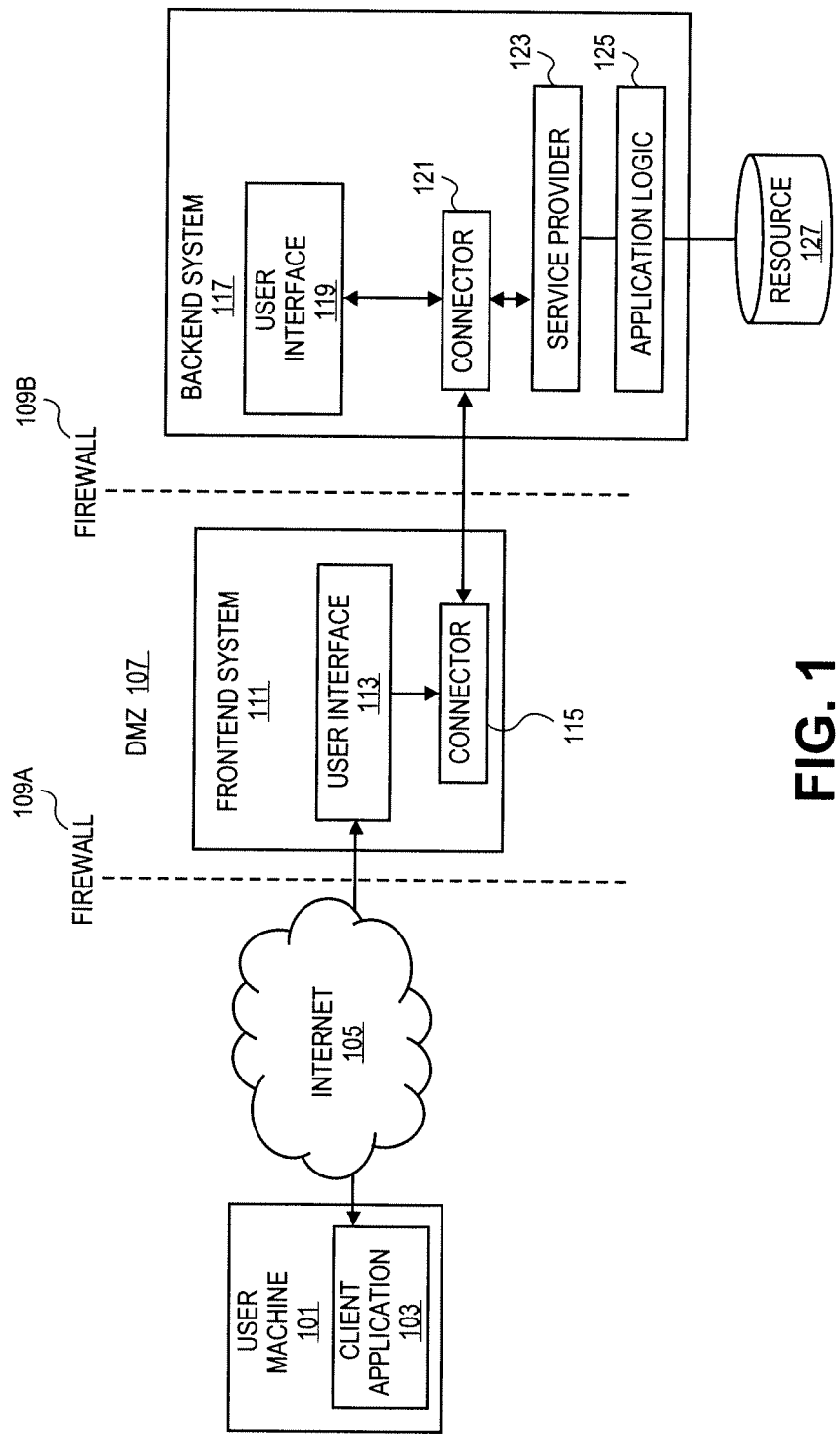
FIG. 1 is a diagram of one embodiment of a framework that utilizes a demilitarized zone (DMZ) to protect server resources.

FIG. 1 is a diagram of one embodiment of a demilitarized zone (DMZ) framework for protecting server resources. The DMZ framework includes a frontend system 111 and backend system 117. The DMZ framework can be accessed by a set of user machines 101 over a network 105. A 'set,' as used herein refers to any whole positive number of items including one item. The network can be any type of a network including a local area network (LAN), a wide area network (WAN) such as the Internet, or a similar network. The network can be a wireless network or a wired network. In another embodiment, the network can be composed of any combination of wireless or wired components.

A user machine 101 can be any type of computing device capable of network communication including a desktop computer, laptop computer, console device, handheld device, wireless device or similar computing device. The user machine 101 executes or includes a module that provides a client application 103. A client application 103 can be any component or software application that enables a user to access a resource from a backend system 117. In one example embodiment, the client application 103 is a web browser. In this example embodiment, the client application 103 in the form of web browser utilizes the HTTP protocol to communicate with the frontend system 111 and to generate a request for a desired resource such as a web page. Other types of client applications can include business applications, gaming applications, database applications and similar applications.

The user machine 101 communicates with the frontend system 111 through a first firewall 109A. The firewall 109A can be provided by the computer device that executes the frontend system 111 or can be provided by a separate computing device or network device. Any number of firewalls can be established between the user machine 101 and the frontend system 111. The firewall 109A can be configured to restrict the types of protocols, the range of ports, the content of requests and similar aspects of communication utilized to access the frontend system 111.

The frontend system 111 provides a user interface module 113 and connector 115. The frontend system 111 can be executed by or be a component of any type of computing system including a desktop computer, laptop computer, server, console device, handheld computer, wireless device or similar computing device. The user interface module 113 generates a user interface for accessing the resources of the backend system 117. The user interface module 113 replicates a similar user interface 119 provided by the backend system 117 in terms of functionality and features. However, none of the resources that are to be accessed through the user interface module 113 are present in the frontend system 111. In one embodiment, the user interface module 113 can be a web based interface provided by a web server or similar application. In another embodiment, the user interface module 111 is a dedicated application for interfacing with a specific type of client application 103.

The user interface module 113 is configured to access the resources that are requested by a client application 103 via a first protocol by using a connector 115. The connector 115 receives requests for resources from the user interface module 113 and services these requests through the corresponding connector 121 on the backend system 117. In one embodiment, the connector 115 is accessible as a generic method or function. The connector 115 can be used to request any resource available on or through a backend system 117. The connector 115 can also be used by any number of user interface modules 113. Multiple user interface modules 113 can be provided to service different types of clients that can seek to access any resource in a set of resources offered by a set of backend systems 117. For sake of clarity, the example described herein involves a single user interface module 113 and a single backend system 117. In one example embodiment, the user interface module 113 is a web server that receives hyper-text transfer protocol (HTTP) requests from a client application 103 that is a browser or similar application. The connector 115 then receives a resource request from the web server and utilizes a separate protocol to communicate with the backend connector 121 from that which is utilized to communicate with the frontend system 111 by the user machine 101 and client application 103. An example second protocol is a remote function call (RFC).

The use of a second and separate protocol for communications between the frontend system 111 and the backend system 117 provides an additional layer of security. A malicious programmer attempting to gain unauthorized access to resources may know that a user machine 101 and client application 103 communicate with the frontend system 111 using the first protocol, but the use of the second protocol is hidden from the malicious programmer.

The frontend system 111 is separated from the backend system 117 by an additional firewall 109B, which may be provided by the backend system 117, a separate network component situated between the frontend system 111 and the backend system 117 or a similar device. The use of a first firewall 109A and second firewall 109B to isolate the frontend system 111 from the backend system 117 in combination with the absence of any of the protected resources in the frontend system 111 creates a demilitarized zone (DMZ). The term DMZ as used herein refers to a space in which no protected resources are present, but in which functionality that relies on protected resources can be offered. The frontend system 111 in the DMZ provides functionality to the client application 103 and indirect access to resources of the backend system 117 without exposing these resources to malicious programs and programmers. If the frontend system 111 is compromised by a malicious program or similar attack, then the resources remain safe in the backend system 117.

The backend system 117 includes a connector 121, a service provider layer 123 and an application logic layer 125, as well as, a set of resources 127. The backend system 117 can be provided by any type of computing device as a component thereof or by executing or otherwise providing the constituent components of the backend system 117. The backend system 117 can be a single computing device or can be distributed over a set of computing devices.

The user interface module 119 of the backend system 117 can be any type of user interface including a command line interface, web-based interface or a graphical user interface. The user interface module 119 provides access to and interaction with the resources 127 offered by the backend system 117. The user interface module 119 is accessible to a local user of the backend system 117. The local user interface module 119 can communicate through a connector 121 with a service provider module 123 or application logic 125. In another embodiment, the local user interface module 119 can interact directly with the service provider 123 and application logic 125.

The connector 121 services communication request from the corresponding connector 115 of the frontend system 111. The connectors 115, 121 utilize a protocol that is separate and distinct from the protocol that is utilized between the user machine 101 and client application 103 and the frontend system 111. Use of the second and distinct communication protocol provides additional security for the resources of the backend system 117 by hiding the protocol and location information necessary to gain access to the resources of the backend system 117. In one example embodiment, the frontend 111 connector 115 and backend 117 connector 121 utilize remote function calls (RFC) to interact and exchange data. In other embodiments, other protocols such as remote procedure calls, remote method invocation and similar systems can be utilized in place of or in combination with RFCs.

The connectors 115, 121 can provide a set of general functions that can be called by the respective user interface module 115, 121. The use of a set of generic functions that are not specific to a user interface 115, 121 or any other application allows the connectors to be utilized with any number of user interface modules 113, 119 and any set of corresponding resources 127.

The service provider module 123 is a software layer component that interacts directly with the application logic 125. The service provider module 123 receives generic requests for resources from a connector 121 and generates a corresponding application logic specific command, instruction or request necessary to obtain, modify or otherwise interact with the resources 127 as indicated by the client application 103 in the original request. In one embodiment, the service provider module 123 includes a set of metadata or accesses a set of metadata that provides information on the types of resources 127 available including the information about databases or application resources and methods for utilizing these applications and databases that are available through the backend system 117. This metadata can be utilized by the service provider 123 to map the incoming generic requests from the connector 121 to specific functions or requests directed to the application logic 125.

The application logic 125 can be any set of applications or programs that directly provides data or that provides functionality that accesses, returns or processes data that is stored in a persistent storage unit or similar device or similarly interacts with a resource 127 provided by the backend system 117. A backend system 117 can have separate application logic layers 125 for each resource 127 or a monolithic application logic 125 can be utilized to manage the interactions with all resources 127.

Figure 2:
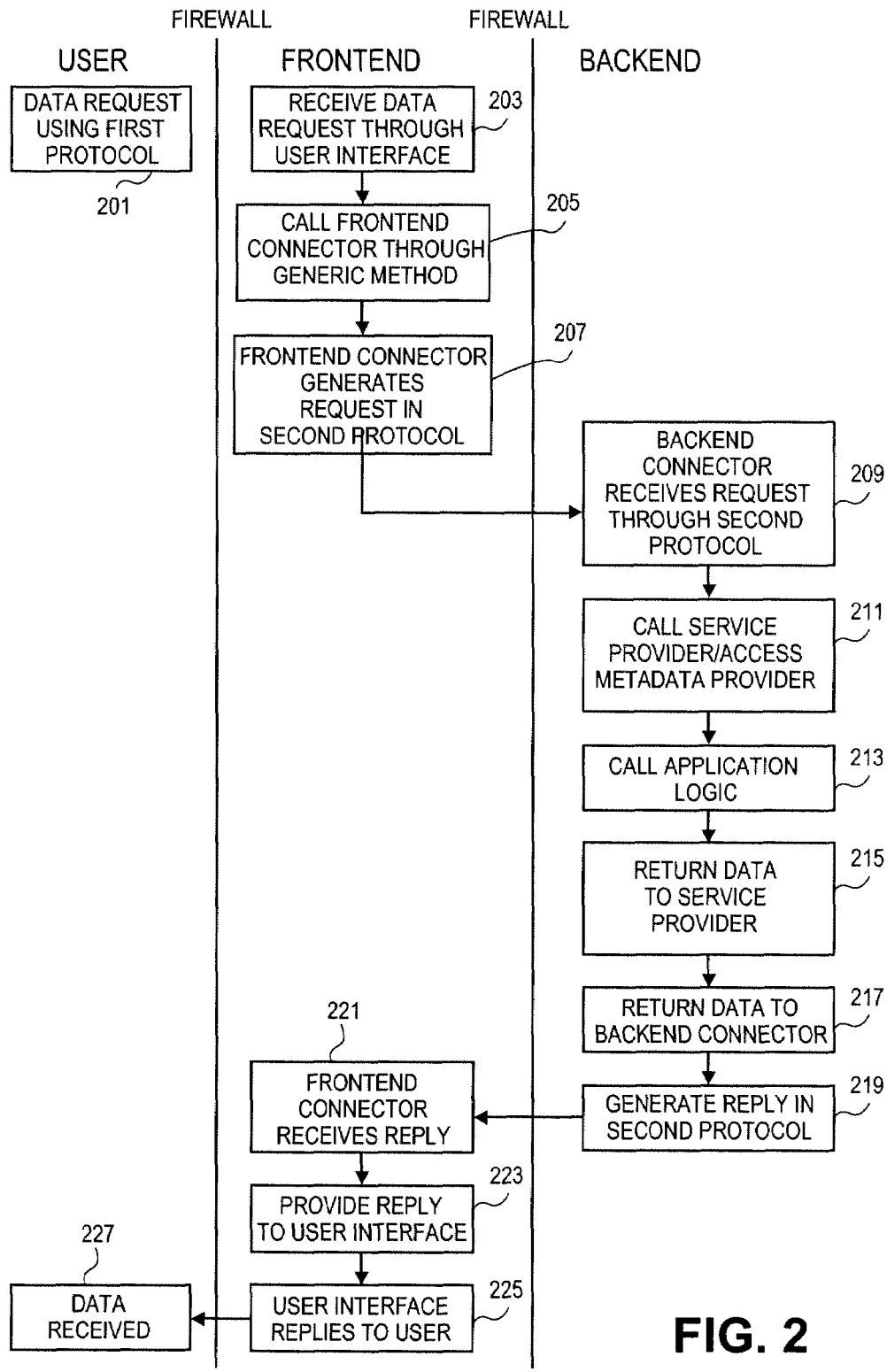
FIG. 2 is a flowchart of one embodiment of a process for servicing requests through the DMZ framework.

FIG. 2 is a flowchart of one embodiment of a process for servicing a request from a client application and user machine. The process is initiated by a user machine executing a client application. The client application generates a request in a first protocol that is directed to a user interface of a frontend system (Block 201). The protocol can be any type of protocol such as HTTP, file transfer protocol (FTP) or similar communication protocol [*please provide a list of any other possible protocols*]. The client application request is directed to a user interface module of a frontend system over a network. The frontend system may be publically known or the user, user machine or client application may have specific knowledge of the frontend system. The user may have to first log in or similarly be authenticated with the frontend system.

This request from the user, user machine or client application crosses a first firewall before being received by the user interface module of the frontend system. The frontend system receives the data request through a user interface module (Block 203) or similar application. The user interface module could be a specialized application, a general purpose web server or similar program. The user interface module parses the incoming data request and determines whether a further request for resources is necessary in order to service the received request.

If further resources are required from the backend system, then the user interface module of the frontend system generates a call to the connector (Block 205). The call to the connector can be through a general method call or similar interface between the user interface module and the connector. The use of a generic or general method or interface allows any number of user interfaces for separate backend resources to be supported by a connector or an instance of a connector. In response to receiving the call or request from the user interface module, the connector generates a request to the backend system using a second protocol (Block 207). The second protocol can utilize any protocol that is separate and distinct from the first protocol to hide the communication protocol and the location of the backend from the user as well as any malicious attacker. Further, the frontend system does not have any of the actual resources that are protected by the DMZ framework, thereby minimizing the risks to these resources in the case that the frontend system is breached.

The backend system includes a connector that receives the request using the second protocol from the connector of the frontend system (Block 209). The second protocol may be a remote function call (RFC) or similar protocol that indicates a generic function or specific function that has been requested as well as a data resource upon which the function is to be carried out. For example, the request can be a simple access function to retrieve data from a database. The connector then calls a service provider to interact with the underlying application logic to obtain the necessary resource identified by the request (Block 211).

The service provider may rely on a set of metadata or a set of metadata configuration files that define the functions and data types of the application logic or the resource itself. This metadata can also indicate or be used for a mapping of generic methods supported by the user interface module, connectors and similar components to the specific functions, fields and resources available through the application logic. The service provider then makes the appropriate call to the application logic (Block 213) to obtain the necessary data for servicing the request from the user. Once the application logic has completed the operation any data to be returned is provided to the service provider by the application logic (Block 215). This initiates the return process by which the requested data is ultimately returned to the originator of the request, which is the user, user machine and client application. The service provider provides the response or returns its response to the backend connector that called the service provider.

The backend connector then manages the return of the data to the corresponding connector on the frontend system (Block 217 and Block 219). This return or response of the backend service connector utilizes the second protocol. In another embodiment, a third discrete protocol could be utilized to send the response or return data to the frontend. The connector of the frontend system receives the reply using a known protocol (Block 221). The return data is then provided to the user interface on the front end system (Block 221). The user interface then generates a reply using the first protocol to supply the requested information to the user (Block 225). The data is then received by the originating user machine and client application (Block 227).

In one embodiment, the frontend system and backend system that provide the DMZ framework may be implemented as hardware devices. In another embodiment, these components may be implemented in software (for example micro code, assembly language or higher level languages). These software implementations may be stored on a computer=readable medium. A "computer-readable" medium can include any medium that can store information. The examples of the computer-readable medium include a read only memory (ROM), a floppy diskette, a CD Rom, a DVD, a flash memory, a hard drive, an optical disc or similar medium.

In the foregoing specification, the invention has been described with references to specific embodiments. It will, however, be evident that various modifications and changes can be made thereto without departing from the broader spirit and scope that is set forth in the appended claims. The specification and drawings are accordingly to be regarded in illustrative rather than a restrictive sense.

What is claimed is:

1. A method for data access comprising:
   processing a first request for data according to a first protocol at a frontend system in a demilitarized zone, the frontend system providing a user interface for a backend system; and
   sending a second request for the data according to a second protocol to a connector to the backend system to service the second request
   providing local access to a user of a resource through a backend interface, the backend system to send a user data request to the connector of the backend system.

2. The method for data access of claim 1, further comprising:
   calling a generic connector to initiate the second request.

3. The method for data access of claim 1, further comprising:
   transforming the first request into the second request.

4. The method for data access of claim 1, wherein the first request is received across a first firewall.

5. The method for data access of claim 4, wherein the first request is received across a second firewall.

6. The method for data access of claim 1, further comprising:
   processing the second request by a connector at the backend system.

7. The method of claim 1, further comprising:
   calling a service provider to generate a call to backend system application logic.

8. A system for secure data access control comprising:
   a user interface module to respond to a data request in a first protocol from a user, the user interface module in a demilitarized zone and providing a user interface for a backend system;
   a frontend connector to convert the data request to a second protocol for interaction with the backend system;
   a backend connector to receive the data request from the frontend connector; and
   a backend user interface to provide local access to a user for a resource, the backend system to send a user data request to the backend connector.

9. The system for secure data access control of claim 8, further comprising:
   a service module to generate a call to application logic in response to a call from a backend system connector.

10. The system for secure data access control of claim 8, wherein the backend connector calls a service provider to service the user data request.

11. A non-transitory computer readable storage medium having stored therein a set of instructions, which when executed, cause the computer to perform a set of operations comprising:
    transforming a request in a first protocol received through a user interface on a frontend system in a demilitarized zone into a request in a second protocol on a backend system; and
    calling a connector of the backend system to service the request in the second protocol; and
    providing local access to a user of a resource through a backend interface, the backend system to send a user data request to the connector of the backend system.

12. The non-transitory computer readable storage medium of claim 11, having stored therein a further set of instructions, which when executed cause the computer to perform a further set of operations comprising:
   calling a generic function of a connector of the frontend system by the user interface.

13. The non-transitory computer readable storage medium of claim 11, wherein the user interface is for the backend system.

14. The non-transitory computer readable storage medium of claim 11, having stored therein a further set of instructions, which when executed cause the computer to perform a further set of operations comprising:
   calling a service provider by the connector of the backend system using a generic function to service the request.

15. The non-transitory computer readable storage medium of claim 11, having stored therein a further set of instructions, which when executed cause the computer to perform a further set of operations comprising:
   calling application logic by the service provider to service the request.

16. The non-transitory computer readable storage medium of claim 11, wherein the frontend system is separated from the backend system by a first firewall.

17. The non-transitory computer readable storage medium of claim 16, wherein the frontend system is separated from a user by a second firewall.

\* \* \* \* \*